June 11, 1968
A. L. HODGES, JR
3,387,487
RECORDING GAS COLLECTOR
Filed Oct. 18, 1965
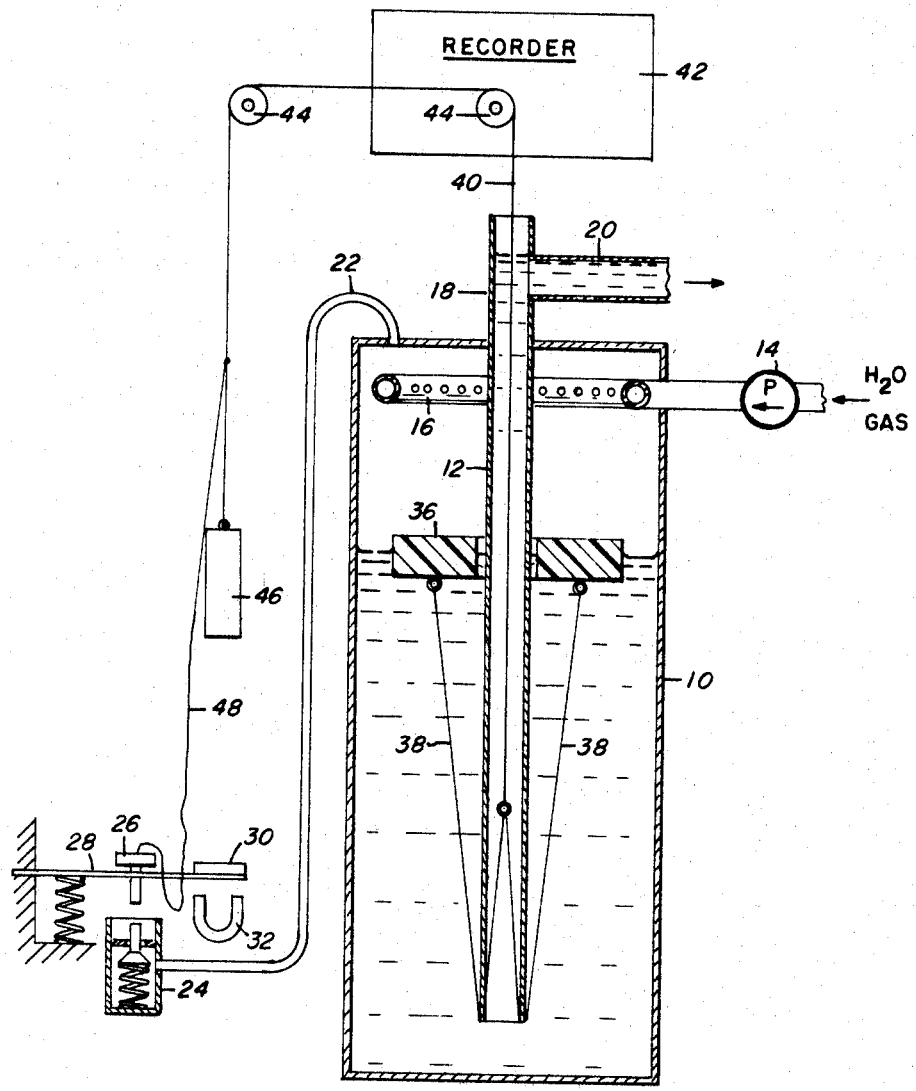
INVENTOR
ARTHUR L. HODGES, JR.
BY 3,387,487
RECORDING GAS COLLECTOR
Arthur L. Hodges, Jr., Montpelier, Vt., assignor to the United States of America as represented by the Secretary of the Interior
Filed Oct. 18, 1965, Ser. No. 497,562
6 Claims. (Cl. 73—19)

The invention herein described and claimed may be manufactured and used by or for the Government of the United States of America for governmental purposes without the payment of royalties thereon or therefor.

The present invention relates to methods and apparatus for measuring undissolved gas content in a liquid. In particular it is concerned with a continuous sampling technique in which liquid, such as ground water produced from wells, is pumped at a constant volumetric rate to a sealed collector vessel where insoluble gases, such as methane, are separated from the liquid phase and permitted to accumulate over a period of time until the gases fill the vessel, at which time the gases are vented from the collector vessel. The rate at which gas accumulates in the vessel is a measure of the gas content of the input stream sample. Liquid level in the vessel is recorded as a function of time and furnishes the basis for analysis of the liquid-gas composition.

Presently available methods used to determine small amounts of gas in fresh water are not adaptable for use in long-term monitoring applications. No inexpensive apparatus is known that will record the insoluble gas content in water over extended periods of time.

Accordingly, it is an object of this invention to provide methods and apparatus for measuring and recording the amount of gas above saturation evolved from or absorbed into water. In particular a system is provided wherein a substantially constant volume of liquid containing gas is pumped to a collector vessel. The insoluble gas and liquid phases are separated and the liquid is drained from the vessel while the gas collects at the top of the vessel. It is a further object of this invention to provide means for venting the gas periodically and detecting and controlling liquid level by a float mechanism which is equipped with a counterweight and the motion of which is recorded.

These and other objects and features of the invention may be more readily ascertained from the following description and by inspection of the accompanying drawing in which the single figure represents a schematic vertical cross-section of the apparatus used in the practice of the invention.

Referring to the drawing, the measuring system comprises a sealed collector vessel 10, such as a steel drum, having an axially-located liquid drain conduit, such as stainless steel standpipe 12, connected at the top of the drum. A constant volume delivery pump 14 transports a stream sample of liquid and gas into the collector vessel 10 through a spray ring 16, which is disposed at the top of the vessel and comprises a circular ½-inch copper tube having 1/16-inch holes disposed therein for distributing the incoming liquid and separating the liquid and gas phases. Conduit 12 has a T-connection 18 located outside the vessel 10 which provides a liquid drain outlet means 20.

A venting means is provided for removing gas from upper portions of vessel 10 including purge line 22 and a spring-operated valve means 24, which vents the gas to atmosphere or to a storage line when its valve stem is depressed. Valve 24 is operated by a depressor pin 26 attached to a spring-loaded resilient strip 28, such as a brass metal strip having a brass screw. A magnetic material 30 attached to strip 28 is attracted by the force of magnet 32. The gas venting means is operated in response to a liquid level sensing and transmitting device.

Liquid level in the collector vessel 10 is sensed by using a float mechanism. A ring-shaped float 36 made of polystyrene or other nonporous low-density material is disposed around drain conduit 12. Nylon flexible lines 38 from the float 36 pass through grooves in the lower end of the conduit 12, and are connected to an output cable 40. A wire retainer ring may be used around the lower end of conduit 12 to keep the lines 38 in grooves cut in the conduit. Also, a rod may be attached to the bottom of conduit 12 to limit travel of the float at low liquid levels.

Liquid level in vessel 10 is recorded by sensing the motion of cable 40. This may be accomplished by any number of commercially-available time-motion instruments, such as a Stevens Type F level recorder. The record may be a strip chart, drum, circular chart or other suitable readout device.

Cable 40 is held taut by a counterweight system including pulleys 44 and a counterweight 46, such as a nonmagnetic brass metal cylinder. A pull-off string 48, or other suitable lost-motion means, is attached to the cable 40 or counterweight to operate the venting means.

EXAMPLE

Ground water containing undissolved gas is pumped at a substantially constant rate of flow at 75 liters per hour and at nominal pressure. The liquid passes from pump 14 through spray ring 16 where the two phases are separated into liquid and gas by gravity. Gas collects in the upper portion of vessel 10 and water flows downwardly to the liquid drain means where it flows through conduit 12 upwardly and overflows through T-connection 18 to drain outlet 20, where the water may be discarded or returned to storage or utilized. As more liquid is introduced into the system accumulated gas increases in volume, forcing the water level to recede. The pressure of the gas in vessel 10 varies according to the level differential between the liquid level in the collector vessel 10 and the liquid drain outlet 20. As more gas accumulates, the pressure increases, but the average pressure may be easily calculated for calibration purposes. Float 36 follows the liquid level and operates the recording mechanism 42 to which it is operatively connected by lines 38 and cable 40. As the float drops, so does the counterweight 46. When the float 36 reaches a point near the bottom of its permitted travel, the counterweight 46 contacts the magnetic material 30 disposed at the end of brass strip 28, thus overcoming the spring-loaded strip and moving depresser pin 26 against the stem of valve 24. Gas is vented from vessel 10 through line 22 to atmosphere or storage.

The venting means is maintained open during the subsequent filling cycle by magnet 32, which exerts sufficient force on material 30 to keep the depresser pin 26 in its lower position after counterweight 46 has been removed from the brass strip 28. Venting of the gas from the top of sealed vessel 10 permits the water level to rise in the vessel during the filling cycle. The float 36 and counterweight 46 rise simultaneously until they reach the top limit of their travel, at which time pull-off string 48 becomes taut and exerts sufficient force to overcome the pull of magnet 32. Spring-loaded strip 28 returns to its upper position, removing pin 26 from the stem of valve 24 and closing the gas vent means.

Table 1 gives the results of a series of collecting and filling cycles over a six-day period at a sample flow rate of 75 liters of water per hour.

TABLE 1

| Fill cycle number | 1 | 2 | 3 | 4 | 5 | 6 | 7 | 8 | 9 | 10 | Average |
|---|---|---|---|---|---|---|---|---|---|---|---|
| Fill time (hours) | 11.7 | 11.5 | 12.0 | 11.3 | 12.0 | 12.0 | 12.0 | 11.8 | 12.1 | 11.8 | |
| Total gas accumulated (cc.) [1] | 41,100 | 40,500 | 41,100 | 40,500 | 41,100 | 40,800 | 41,400 | 40,500 | 41,100 | 40,500 | |
| Volume of gas (cc.) per hour [2] | 3,510 | 3,520 | 3,420 | 3,580 | 3,420 | 3,400 | 3,450 | 3,430 | 3,400 | 3,430 | |
| Gas content of water (cc./l.) [3] | 46.8 | 46.9 | 45.6 | 47.7 | 45.6 | 45.3 | 46.0 | 45.7 | 45.3 | 45.7 | 46.1 |

[1] Total gas accumulated (ft.)×drum constant (1 ft.=30,000 cc. gas)=total gas accumulated (cc.).
[2] Total gas accumulated (cc.)/fill time (hours)=cc. gas/hour.
[3] At well head temperature and pressure.

The invention has been illustrated by specific example but there is no intent to limit the invention to the specific details so disclosed in the description and drawing, except insofar as set forth in the following claims.

What is claimed is:

1. A system for recording insoluble gas content of a liquid comprising
    pumping means for delivering a substantially constant column of a gas-liquid mixture to a collector vessel;
    liquid drain means connected to an upper portion of said vessel and having a standpipe extending to a predetermined vessel level;
    gas venting means connected to an upper portion of the vessel;
    means for operating the gas venting means responsive to liquid level in the vessel to open the venting means at a lower liquid level and close the venting means at a higher liquid level; and
    means for recording liquid level in the vessel.

2. The system of claim 1 wherein a float is maintained in the vessel and the gas venting means is operated in response to float position.

3. The system of claim 2 wherein the liquid level recording means is responsive to float position.

4. The system of claim 3 wherein a counterweighted cable is attached to the float and operatively connected to the recording means and gas venting means.

5. A method for measuring undissolved gas content of a liquid comprising
    feeding a two-phase mixture of gas and liquid to a closed collector vessel, and separating the feed stream into gas and liquid;
    collecting gas in the vessel while removing liquid from the vessel;
    lowering liquid level in the vessel as gas accumulates;
    venting gas from the vessel when the liquid level reaches a predetermined lower level, thereby raising the liquid level in the vessel;
    reclosing the collector to prevent venting of gas therefrom when the liquid level reaches a predetermined upper level; and
    recording the liquid level as a function of time.

6. The method of claim 5 wherein the liquid is ground water.

References Cited

UNITED STATES PATENTS

| 2,741,911 | 4/1956 | Fitzpatrick et al. | 73—19 |
| 2,897,913 | 8/1959 | Hudson | 55—170 |
| 3,060,723 | 10/1962 | Kapff et al. | 73—19 |
| 3,282,030 | 11/1966 | Griffo et al. | 55—170 |
| 3,344,587 | 10/1967 | Wakeman | 55—170 |

RICHARD C. QUEISSER, *Primary Examiner.*

C. IRVIN McCLELLAND, *Assistant Examiner.*